US012729104B2

(12) United States Patent
Benistand-Hector et al.

(10) Patent No.: US 12,729,104 B2
(45) Date of Patent: Sep. 8, 2026

(54) FLUID COMPRESSION APPARATUS AND FILLING STATION

(71) Applicant: L'Air Liquide, Societe Anonyme pour l'Etude et l'Exploitation des Procedes Georges Claude, Paris (FR)

(72) Inventors: Cyril Benistand-Hector, Sassenage (FR); Javier Gutierrez, Willich (DE)

(73) Assignee: L'Air Liquide, Societe Anonyme Pour l'Etude et l'Exploitation des Procedes Georges Claude, Paris (FR)

(*) Notice: Subject to any disclaimer, the term of this patent is extended or adjusted under 35 U.S.C. 154(b) by 229 days.

(21) Appl. No.: 18/777,014

(22) Filed: Jul. 18, 2024

(65) Prior Publication Data

US 2025/0026627 A1 Jan. 23, 2025

(30) Foreign Application Priority Data

Jul. 18, 2023 (FR) ................................ FR 2307684

(51) Int. Cl.
*B67D 7/64* (2010.01)
*F04B 15/08* (2006.01)
*F04B 53/14* (2006.01)

(52) U.S. Cl.
CPC ................ *B67D 7/64* (2013.01); *F04B 15/08* (2013.01); *F04B 53/143* (2013.01); *F04B 2015/081* (2013.01)

(58) Field of Classification Search
CPC ............. H01J 2237/2485; H01J 37/241; H01J 37/32091; H01J 37/32146;
(Continued)

(56) References Cited

U.S. PATENT DOCUMENTS 5,944,498 A * 8/1999 Wupper ................ B60T 8/4031 417/63
6,898,940 B2 * 5/2005 Gram ...................... F04B 15/08 62/50.6

(Continued)

FOREIGN PATENT DOCUMENTS

FR 783 104 7/1935
FR 3 107 573 8/2021
FR 3 123 094 11/2022

OTHER PUBLICATIONS

French Search Report for FR 2 307 684, mailed Jan. 9, 2024.

*Primary Examiner* — Filip Zec
(74) *Attorney, Agent, or Firm* — Allen E. White; Elwood L. Haynes

(57) ABSTRACT

A cryogenic-fluid compression apparatus having a compression chamber, an intake system, a piston, a discharge orifice in communication with the compression chamber and designed to enable the egress of compressed fluid, the piston comprising a tubular portion mounted about a static central guide connected to the static structure, the apparatus having a sealing system formed between the central guide and the tubular portion of the piston, the compression chamber being delimited by the tubular portion of the piston and a terminal end of the central guide, the central guide being connected to the static structure via a support part received in a longitudinal opening formed in the body of the piston and enabling the relative longitudinal sliding of the piston about the support part. The invention also relates to a filling station comprising such an apparatus.

15 Claims, 6 Drawing Sheets

(58) Field of Classification Search

CPC ........... H01J 37/32174; H01J 37/32348; H01J 37/3467; B67D 7/64; F04B 15/08; F04B 2015/081; F04B 39/0005; F04B 39/0022; F04B 53/143; F04B 53/146; H03K 3/021; H03K 3/57

See application file for complete search history.

(56) References Cited

U.S. PATENT DOCUMENTS

| | | | | |
|---|---|---|---|---|
| 7,488,161 | B2 * | 2/2009 | Inoue | F04B 53/10 417/470 |
| 8,052,404 | B2 * | 11/2011 | Inoue | F04B 5/00 417/505 |
| 8,075,287 | B2 * | 12/2011 | Inoue | F04B 53/16 417/454 |
| 10,352,322 | B2 * | 7/2019 | Andersen | F04C 15/0023 |
| 10,450,862 | B2 * | 10/2019 | Bonnefous | F01L 1/344 |
| 10,781,814 | B2 * | 9/2020 | Plisch | F04B 53/02 |
| 10,808,688 | B1 * | 10/2020 | Raghavan | F04B 53/101 |
| 10,935,023 | B2 * | 3/2021 | Plantard | F04B 15/00 |
| 11,009,020 | B2 * | 5/2021 | Velásquez-García | F04B 43/06 |
| 2002/0085921 | A1 * | 7/2002 | Gram | F04B 19/06 417/528 |
| 2007/0028628 | A1 | 2/2007 | Chalk et al. | |
| 2014/0127062 | A1 * | 5/2014 | Buckley | F04B 53/16 417/439 |
| 2020/0116141 | A1 * | 4/2020 | Fitzner | F04B 45/02 |
| 2020/0232456 | A1 * | 7/2020 | Plantard | F04B 53/143 |
| 2021/0332950 | A1 | 10/2021 | Petitpas et al. | |
| 2023/0071844 | A1 | 3/2023 | Benistand-Hector et al. | |
| 2024/0230032 | A1 | 7/2024 | Benistand-Hector et al. | |

* cited by examiner

[Fig. 1]
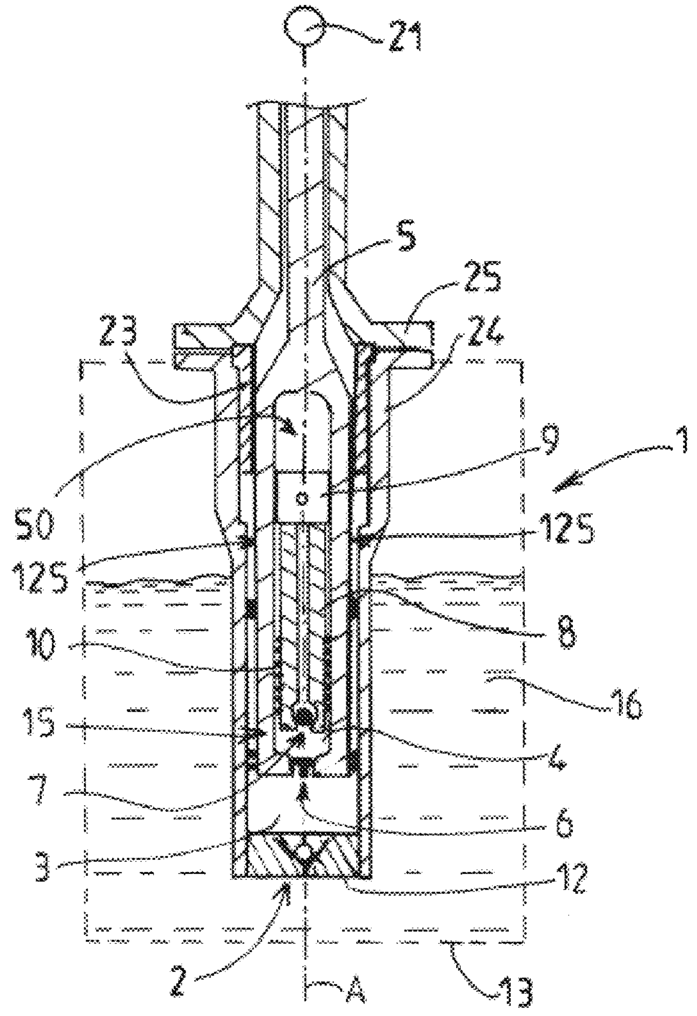

[Fig. 2]
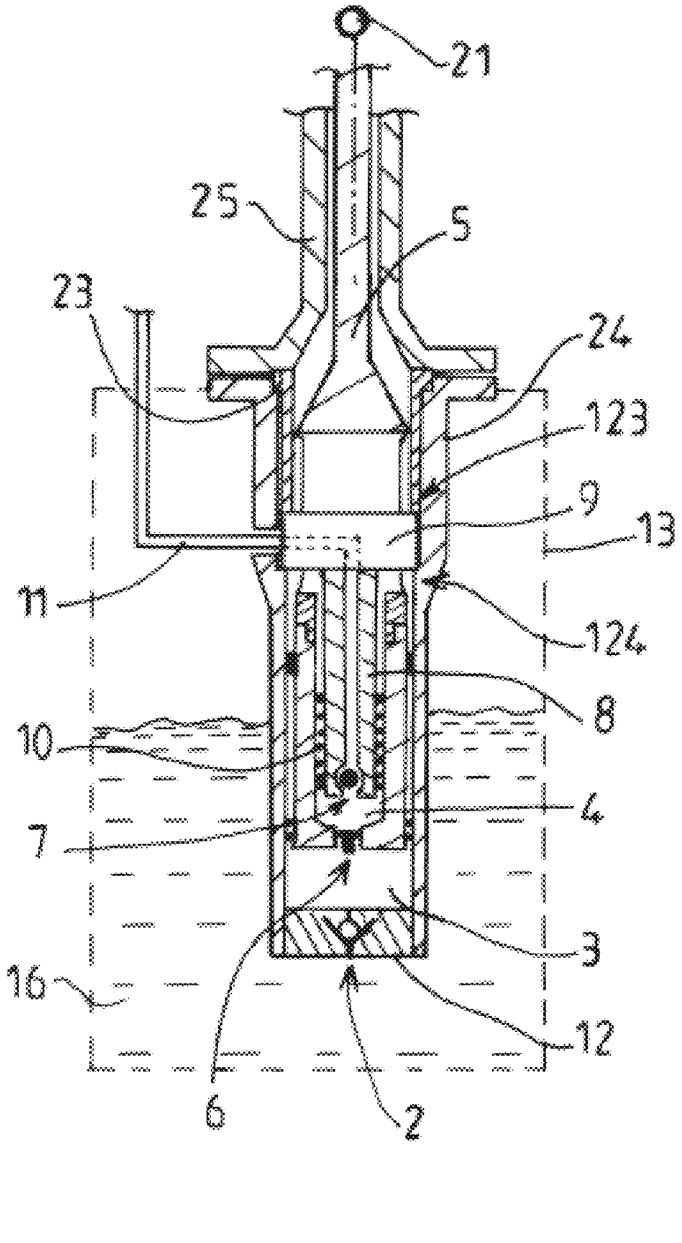

[Fig. 3]
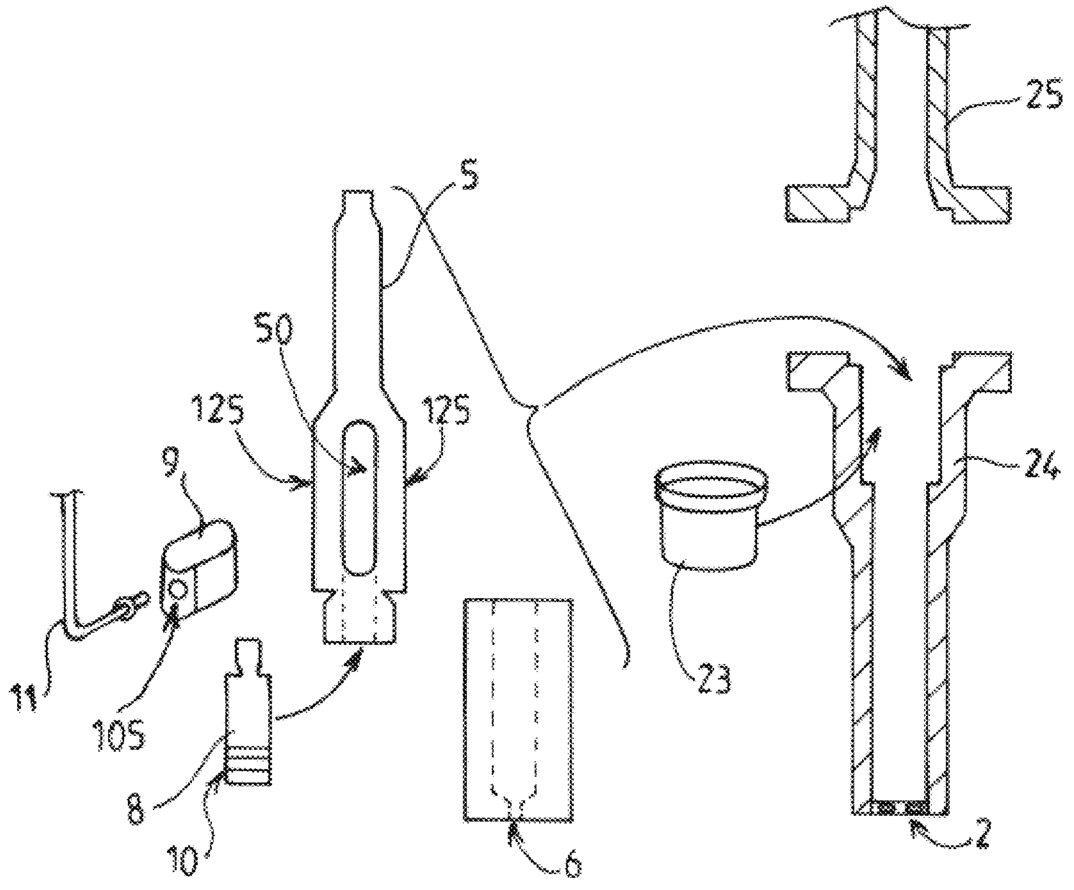

[Fig. 4]
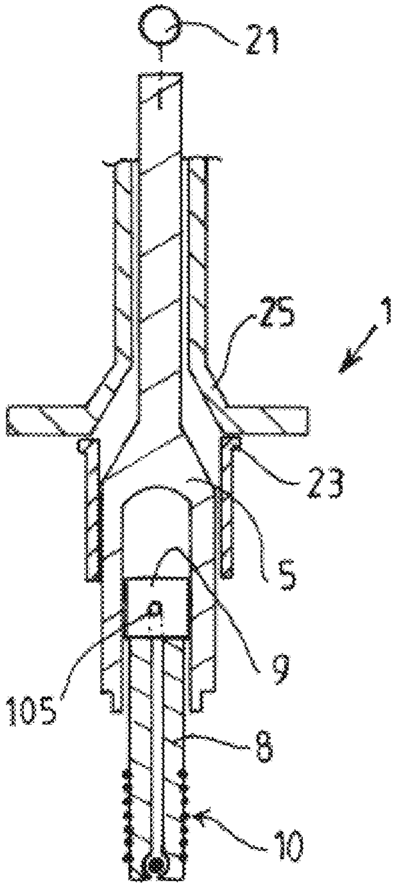

[Fig. 5]
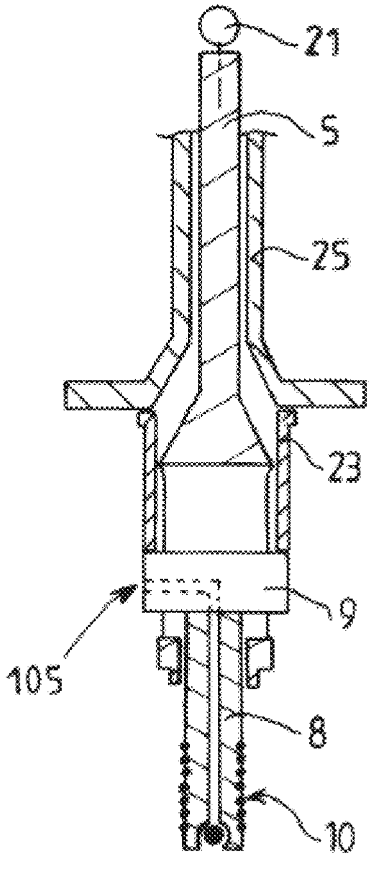

[Fig. 6]
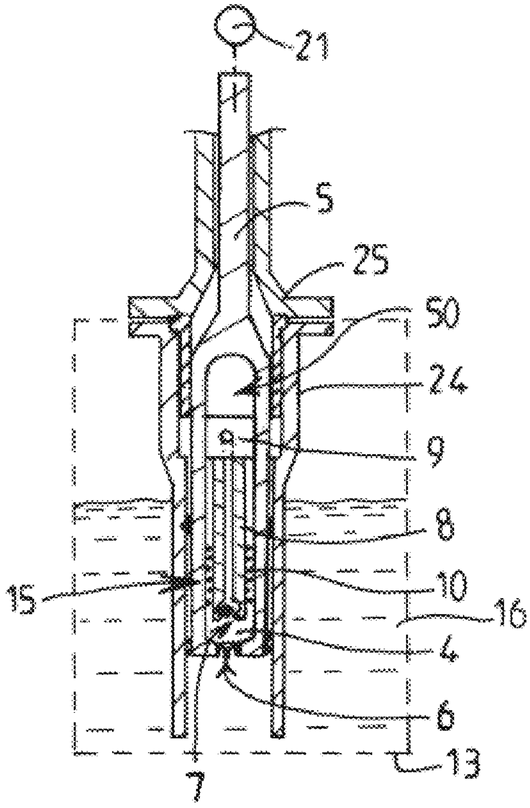
[Fig. 7]
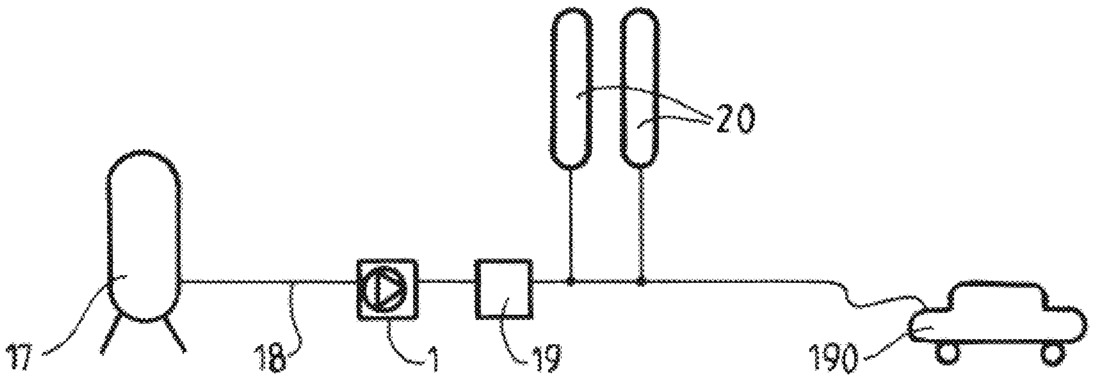

FLUID COMPRESSION APPARATUS AND FILLING STATION

CROSS-REFERENCE TO RELATED APPLICATIONS

This application claims the benefit of priority under 35 U.S.C. § 119(a) and (b) to French patent application No. FR 2 307 684, filed Jul. 18, 2023, the entire contents of which are incorporated herein by reference.

BACKGROUND

The invention relates to a fluid compression apparatus and a filling station.

FIELD OF THE INVENTION

The invention relates more specifically to a fluid compression apparatus, in particular for a cryogenic fluid, comprising a compression chamber, an intake system in communication with the compression chamber, a piston comprising an axial body moveable in translation in a longitudinal direction to compress the fluid in the compression chamber, the piston being moveable in relation to a static structure of the apparatus, the apparatus comprising a discharge orifice in communication with the compression chamber and designed to enable the egress of compressed fluid, the body of the piston comprising a tubular portion mounted about a static central guide connected to the static structure, the apparatus comprising a sealing system formed between the central guide and the tubular portion of the piston, the compression chamber being delimited by the tubular portion of the piston and a terminal end of the central guide.

RELATED ART

The architecture of known cryogenic pumps is relatively complex and/or requires a relatively large number of parts and/or may cause premature wearing of parts.

In particular, the relative arrangement of the moveable parts (piston) and static parts (static structure) requires complex assembly. Known solutions use a plate forming a support for the piston. The plate is traversed by one or more shafts to transmit the forces from the actuator (motor, usually in the upper portion) to the sleeve or the piston (usually in the lower portion).

Document FR3107573A1 describes an example pumping device from the prior art.

SUMMARY OF THE INVENTION

One objective of this invention is to mitigate some or all of the drawbacks of the prior art as set out above.

For this purpose, the apparatus according to the invention, which is otherwise as described in the generic definition given in the preamble above, is essentially characterized in that the central guide is connected to the static structure via a support part received in a longitudinal opening formed in the body of the piston, enabling the relative longitudinal sliding of the piston about the support part.

This arrangement is relatively simple and ensures very good alignment of the parts. This improves the service life of the wear parts (seals, wiper seals, guide rings).

This arrangement enables simple, reliable, reproducible assembly of all of the parts.

Furthermore, the embodiments of the invention may have one or more of the following features:

- during the translational movements of the piston, the body of the piston slides about the support part without passing through the support part,
- the longitudinal opening of the piston is delimited by a fork-shaped portion of the body of the piston with several branches, the longitudinal opening being formed by the spacing between the branches,
- the support part extends transversely to the longitudinal direction between two lateral ends projecting beyond the body of the piston, each of the two lateral ends of the support part being connected to the structure,
- the central guide is rigidly connected to the support part by at least one of the following: screwing, fitting, and elastic deformation, the support part being rigidly connected to the static structure, for example by butting, fitting, clamping or screwing,
- the support part is held longitudinally static in the structure between two longitudinal holding stops located on both sides of the support part in a longitudinal direction,
- the structure comprises two tubular housing portions joined longitudinally to one another about the piston,
- at least one of the two tubular housing portions forms a longitudinal holding stop at one longitudinal end of the support part,
- the apparatus comprises a spacer mounted about the body of the piston, the spacer being arranged between the body of the piston and at least one of the two tubular housing portions, the spacer forming a longitudinal holding stop at one longitudinal end of the support part,
- the support part is held static transversely to the longitudinal direction by a transverse holding stop formed by the structure,
- the discharge orifice is located at the terminal end of the central guide, the apparatus comprising a discharge circuit for the compressed fluid comprising a first end connected to the discharge orifice and a second end located opposite the first end in the longitudinal direction, the discharge circuit for the compressed gas passing through the body of the central guide and the support part,
- the body of the piston is made of several parts joined longitudinally to one another in a disassemblable manner,
- the tubular portion and the fork-shaped portion of the body of the piston are joined longitudinally to one another in a disassemblable manner, for example by screwing,
- the apparatus is a two-stage compression apparatus and comprises a pre-compression chamber, a pre-intake system in communication with the pre-compression chamber designed to enable fluid to enter the pre-compression chamber, the intake system being in communication with the pre-compression chamber to enable compressed fluid in the pre-compression chamber to be transferred to the compression chamber for additional compression,
- the apparatus comprises a fluidtight enclosure connected to the structure and designed to contain a bath of cryogenic fluid including a liquid phase and an expansion space, the compression chamber being seated in the enclosure to be immersed in the bath,
- in the longitudinal direction of translational movement of the piston, the pre-intake system is located at a first end of the apparatus, preferably a lower end, the discharge orifice being located at a second end of the apparatus, preferably an upper end, the pre-intake system comprises one or more ports enabling or preventing communication between the pre-compression chamber and the external bath depending on the longitudinal position of the piston, the port or ports are arranged so as to enable communication between the pre-compression chamber and the external bath when the piston moves beyond said ports, i.e. when the piston is located beyond at least a part of the port or ports, during the intake phase, when the volume of the pre-compression chamber is increasing, the port or ports are designed to allow any gas in the pre-compression chamber to escape via the port or ports to the external bath, to be replaced by liquid, during the compression phase, i.e. when the piston is reducing the volume of the pre-compression chamber, the port or ports are designed to allow the surplus liquid to escape and to meter the volume of liquid trapped in the pre-compression chamber to a determined value, before ceasing to be in communication with the first pre-compression chamber, the intake system comprises at least one of the following: one or more non-return valves, at least one flat-disc valve or valves designed to allow the fluid to be compressed to enter the compression chamber (pre-compression chamber) during an intake phase and to prevent the egress of fluid during the compression phase.

The invention also relates to a station for filling tanks or lines of pressurized gas comprising a source of liquefied gas, notably liquefied hydrogen, a withdrawal circuit having a first end connected to the source and at least one second end intended to be connected to a tank that is to be filled, the withdrawal circuit comprising a pumping apparatus or a fluid compression apparatus according to any one of the features above or below.

The invention may also relate to any alternative device or method comprising any combination of the features above or below within the scope of the claims.

Further particular features and advantages will become apparent upon reading the description below, which is provided with reference to the figures, in which:

BRIEF DESCRIPTION OF THE FIGURES

The invention will be better understood upon reading the following description, which is given solely by way of example and with reference to the appended drawings, in which:

FIG. 1 is a schematic partial vertical cross section view taken in a first section plane of a fluid compression apparatus according to a first embodiment, FIG. 2 is a schematic partial vertical cross section view taken in a second section plane perpendicular to the first section plane of the fluid compression apparatus in FIG. 1, FIG. 3 is a schematic partial perspective view of the fluid compression apparatus in FIG. 1 in the disassembled state, FIG. 4 is a schematic partial vertical cross section view taken in a first section plane of a detail of the partially disassembled fluid compression apparatus, FIG. 5 is a schematic partial vertical cross section view taken in a second section plane of a detail of the partially disassembled fluid compression apparatus, FIG. 6 is a schematic partial vertical cross section view taken in a first section plane of a fluid compression apparatus according to a second embodiment, FIG. 7 is a partial schematic view of an example tank filling station.

DETAILED DESCRIPTION OF THE INVENTION

Throughout the figures, the same reference signs relate to the same elements.

In this detailed description, the following embodiments are examples. Although the description refers to one or more embodiments, this does not mean that the features apply only to a single embodiment. Individual features of different embodiments may also be combined and/or interchanged in order to provide other embodiments.

The fluid compression apparatus 1 illustrated in FIG. 6 is an example embodiment with one compression stage. This compression apparatus 1 is for example a pump for pumping a cryogenic fluid, for example liquid hydrogen, preferably at high pressure (typically several hundred bar).

The compression apparatus 1 comprises a compression chamber 4, an intake system 6 in communication with the compression chamber 4, and a piston 5 comprising an axial body moveable in translation in a longitudinal direction A, one end of which compresses the fluid in the compression chamber 4.

The apparatus 1 has a static structure 24, 25 that carries most of the static and moveable parts, and notably a fluidtight enclosure 13 connected to the structure 24, 25 and designed to contain a bath 16 of cryogenic fluid including a liquid phase and an expansion space. The compression chamber 4 is seated in the enclosure 13 to be immersed in the bath 16.

As illustrated, the structure may comprise two tubular housing portions 24, 25 (or sleeves) joined hermetically and longitudinally to one another about the piston 5, for example by screwing.

The piston 5 is moveable in translation in the structure in the longitudinal direction A in an alternating motion. The piston 5 is for example moved by an actuator 21 (motor optionally associated with a movement transformation system). The actuator 21 is preferably located at the top of the apparatus 1, for example mounted on the structure.

Any type of actuator 21 may be used: a linear actuator, for example a hydraulic cylinder, and electromechanical cylinder, a ball screw, a roller screw, or a rotating slider crank movement conversion system itself driven by a gear motor, a motor and a belt, or a direct drive motor.

The compression apparatus 1 comprises a discharge orifice 7 that is in communication with the compression chamber 4 and is designed to enable the egress of compressed fluid. The body of the piston 5 comprises a tubular portion 15 mounted about a static central guide 8. The central guide 8, which is for example cylindrical, is connected to the structure 24, 25.

A sealing system 10 is provided between the central guide 8 and the tubular portion 15 of the piston 5. This sealing system comprises a set of gaskets, for example a set of O-rings, and may be associated with one or more guide rings guiding the tubular portion 15 in relation to the central guide.

The compression chamber 4 is thus delimited by the tubular portion 15 of the piston 5 and a terminal end of the central guide 8.

As illustrated, the entirety of the compression chamber 4 may be contained in the tubular portion of the piston 5.

As illustrated, when in the usage position, the piston 5 is preferably vertical, the intake system 6, the discharge orifice 7, the outlet of the compressed fluid, and the actuator are positioned in this order from bottom to top.

The discharge orifice 7 is preferably located at the lower terminal end of the central guide 8. The apparatus 1 comprises a discharge circuit 11 for the compressed fluid comprising a first end connected to the discharge orifice 7 and a second end located opposite the first end of the apparatus 1. This discharge circuit 11 for the compressed gas preferably passes through the inside of the body of the central guide 8 and through a support part 9 via appropriate channels.

In this non-limiting example embodiment, the fluid in the compression chamber 4 is compressed by an upstroke of the piston 5 (tractive force).

As shown schematically, the central guide 8 is connected to the static structure 24, 25 via a support part 9 received in a longitudinal opening 50 formed in the body of the piston 5, 15 and enabling the relative longitudinal sliding of the piston 5 about the support part 9.

During the translational movements of the piston 5, the body of the piston 5 slides about the support part 9, preferably without passing through the support part 9.

This is also illustrated in FIG. 1, FIG. 2 and FIG. 3, which illustrate another embodiment with two compression stages. The embodiment in FIG. 1, FIG. 2 and FIG. 3 only differs from the embodiment in FIG. 6 in that it has two compression stages. The same elements are denoted by the same references and are not described a second time. The embodiment with two compression stages comprises a pre-compression chamber 3 and a pre-intake system 2 in communication with the pre-compression chamber 3 designed to enable the fluid in the bath 16 to enter the pre-compression chamber 3.

In this configuration, the pre-compression chamber 3 is delimited at the lower end thereof for example by a lower flange 12 (or shutter) that transversely closes the tubular portion at the lower end thereof. This flange 12 may include the pre-intake system 2 (appropriate valve or valves). This lower flange 12 may also include an overflow valve designed to limit the pressure increase in the pre-compression chamber 3. This lower flange 12 may optionally be used to centre the cold end (all of the mechanical parts assembled here) in relation to the enclosure 13. This may be done to ensure alignment between the enclosure 13 and the cold end of the pre-compression chamber via a member for holding the cold end in relation to the enclosure 13 (and to limit any vibration).

The intake system 6 of the compression chamber 4 is in communication with the pre-compression chamber 3 to enable the compressed fluid in the pre-compression chamber 3 (first compression stage) to be transferred to the compression chamber 4 for additional compression (second compression stage).

The first compression stage is executed in this example by a downstroke of the piston 5 (piston compression) while the second compression stage is executed by an upstroke of the piston 5 (traction increase) and so on.

Thus, the lower end of the piston 5 forms a moveable surface for compressing the fluid in the pre-compression chamber 3, whereas the tubular portion of the piston 5 forms a moveable sleeve that cooperates with the terminal end of the central guide 8 to form a system for compressing the fluid in the compression chamber 4, in which the terminal end of the central guide 8 forms a static piston.

The longitudinal direction A of translation of the piston 5 is therefore preferably vertical, the pre-intake system 2 being located at a first lower end of the apparatus 1, the discharge orifice 7 being located at a second upper end of the apparatus 1.

Preferably, the fluid pre-intake system in the pre-compression chamber comprises one or more ports or slots formed in the top of the wall delimiting the pre-compression chamber (ports not shown, for the sake of simplicity) enabling or preventing communication between the pre-compression chamber 3 and the external bath 16, depending on the longitudinal position of the piston 5.

The port or ports may be arranged longitudinally so as to enable communication between the pre-compression chamber 3 and the external bath 16 when the piston 5 moves beyond said ports, i.e. when the piston 5 is located beyond at least a part of the port or ports. During the intake phase, when the volume of the pre-compression chamber 3 is increasing, the port or ports are designed to allow any gas in the pre-compression chamber 3 to escape via the port or ports to the external bath 16, to be replaced by liquid. During the compression phase, i.e. when the piston 5 is reducing the volume of the pre-compression chamber 3, the port or ports are designed to allow the surplus liquid to escape and to meter the volume of liquid trapped in the pre-compression chamber 3 to a determined value, before ceasing to be in communication with the first pre-compression chamber 3.

The pre-intake system 2 and the intake system 6 may comprise at least one of the following: one or more non-return valves, at least one flat-disc valve or valves designed to allow the fluid to be compressed to enter the related chamber (compression/pre-compression) during an intake phase and to prevent the egress of fluid during the compression phase.

As shown notably in FIG. 2, the longitudinal opening 50 of the piston 5 that receives the support part 9 may be delimited by a fork-shaped portion of the body of the piston 5 with two branches 125. The longitudinal opening 50 may therefore be formed by the spacing between the parallel branches 125.

The support part 9 may then extend transversely to the longitudinal direction A between two lateral ends projecting beyond the body of the piston 5. Each of the two lateral ends of the support part 9 may be connected or fastened to the structure 24, 25 on both sides of the body of the piston 5.

The support part 9 may be held longitudinally static in the structure 24, 25 between two longitudinal holding stops 123, 124 located on both sides of the support part 9 in a longitudinal direction A. For example, two tubular portions 24, 25 (or sleeves) are joined to one another longitudinally about the piston 5. This optimizes the transmission of force between the parts 8, 9, 24, 25.

One of the tubular housing portions (for example the lower portion 24) may form a longitudinal holding stop 124 that receives a longitudinal end of the support part 9 (for example the lower end).

As illustrated, a spacer 23, for example a tubular spacer, may be mounted about the body of the piston 5 between the body of the piston 5 and one of the two tubular housing portions 24, 25 (for example in the lower tubular portion 24). The upper end of the spacer 23 for example butts against a shoulder formed by the upper tubular portion 25. The lower end of the spacer 23 for example bears against the upper portion of the support part 9. The support part 9 is therefore blocked longitudinally by the structure 24, 25 between the spacer 23 and the lower tubular portion 24.

The spacer 23 is thus seated above the support part 9 and can retain the latter and furthermore provides the counter force to hold the static central guide 8.

The force is thus transmitted to the upper portion 25 of the housing. This spacer 23 also ensures the centring between the upper housing portion 25 and the lower housing portion 24.

In the example illustrated, the spacer 23 is tube-shaped. Naturally, this spacer may have any other geometry, for example an overall ring shape, for example interposed between the support part and one or other of the housing portions 24, 25.

Equally, the spacer 23 may be omitted. In this case, the top of the support part 9 may for example be blocked longitudinally by a portion 24 of the tubular housing.

The support part 9 is blocked transversely to the longitudinal direction A, for example by a tubular housing portion 24 of the structure surrounding it.

The support part 9 may therefore be rigidly connected to the stopped static structure 24, 25, although fitting, clamping and screwing are all for example possible.

As described in detail below, the central guide 8 may be rigidly connected to the support part 9 by one at least of the following: screwing, fitting, and elastic deformation.

As illustrated in FIG. 3 and in FIG. 4 and FIG. 5, the body of the piston 5 may be made in several parts joined longitudinally to one another in a disassemblable manner, for example by screwing.

For example, the lower tubular portion 15 and the fork-shaped upper portion of the body of the piston 5 are joined longitudinally to one another in a disassemblable manner, for example by screwing. Similarly, the join between the fork-shaped portion and the upper full portion may be joined in a separable manner.

Such an architecture requires relatively few parts and ensures reliable operation while enabling easy assembly and disassembly.

One example assembly of the main components is described below with reference to FIG. 3.

In a first step, the support part 9 may be inserted transversely in the longitudinal opening 50 of the piston 5.

This support part 9 may be mounted with sliding plates on the outer surface thereof (copper plate with PTFE coating, for example) and have sufficient play in relation to the longitudinal opening 50 to ensure relative sliding between the two parts 125 and 9.

The architecture enables good alignment of the parts in the longitudinal direction, which ensures and guarantees a good seal and good durability of the seals 10.

The support part 9 is preferably also mounted with play in the lower housing portion 24 to ensure optimal alignment between the two longitudinal ends of the piston 5 during assembly.

The upper end of the central guide 8 may be rigidly connected to the part 9, for example by screwing, passing through a passage (bore, for example) formed at the lower end of the fork-shaped portion of the piston 5. The tubular portion 15 forming the lower end of the piston may then be mounted about the central guide 8 and fastened to the fork-shaped upper portion of the piston 5.

Naturally, the upper and lower portions of the piston may be fastened in different ways and at different longitudinal points. For example, the two parts of the piston 5 may be separable at the bottom of the tubular portion 15 (sleeve), for example via a threaded base. Similarly, the piston 5 may be a single part. Similarly, the piston 5 may be made up of more than two parts joined together separably. For example, the upper end may be made of several separable parts, and notably of three parts.

This assembly with the support part 9 may be seated in the lower tubular housing portion 24 of the structure. The spacer 23 may in this case be mounted about the piston 5.

The assembly obtained may then be arranged on top of the upper tubular housing portion 25 of the structure. The upper end of the piston 5 is inserted into the upper tubular housing portion 25 (top of the structure). The two parts 24, 25 of the structure may be joined to one another, for example by screwing, at two ends for example including assembly flanges.

Alternatively, the spacer 23 may be mounted above the support part 9 then the upper end of the piston 5 may be inserted in the upper housing portion 25 of the structure. The lower housing portion 24 may then be joined to the upper housing portion 25.

Alternatively, the assembly does not include a spacer 23.

The top of the piston 5 is preferably guided in the upper housing portion 25 that forms a sleeve. This guidance may be provided by one or more interposed guide rings in contact with the piston 5. The guide rings may be made of a material having a low coefficient of friction (for example PTFE and bronze or PTFE and carbon).

The piston 5 may also be guided longitudinally about the tubular portion 15 in the lower housing portion 24 (also with one or more rings, where necessary).

A set of seals (for example segments) carried on the bottom of the tubular portion of the piston may be used to create a seal with the lower housing portion 24. This set of seals may also contribute to longitudinal guidance.

The support part 9 may include an outlet 105 for the pressurized fluid coming from the compression chamber 4 that has passed through the central guide 8, the discharge orifice 7 and through the body of the support part 9. A line of the discharge circuit 11 may be connected to this fluid outlet 105 to collect and convey the compressed fluid to an outlet of the compression apparatus 1.

As shown in FIG. 2, the lower housing portion 24 may include a lateral opening to enable passage of this line 11, and notably the connection end thereof to the support part 9. This fastening of the line to the fluid outlet 105 may be for example executed using a screwed connection, which may be associated with a seal, for example a metal energized seal. Naturally, any other type of conical, NPT or other high-pressure fluid connection may be used.

The upper housing portion 25 is static and may be rigidly connected to or be part of the enclosure 13 containing the bath of cryogenic fluid to be pumped. In particular, this top of the static structure may comprise or constitute an upper mounting flange of the enclosure 13.

The actuator 21 of the piston 5 (motor and related mechanism, where applicable) may be mounted on this upper structure portion 25. The actuator 21 may be coupled mechanically to the upper end of the piston 5 to move the latter in translation and to transmit the forces required for the different intake and compression phases of the fluid.

The main mechanical force that is generated by the piston 5 (fork-shaped portion and tubular portion delimiting the compression chamber) during compression in the compression chamber 4 (traction) is absorbed by the end of the piston forming the compression chamber. This force is transmitted to the support part 9 then to the spacer 23 and to the upper portion 25 of the structure.

The arrangement described above and the assembly/disassembly thereof enable the parts of the mechanism to be guided and aligned.

The number of parts is limited, and assembly/disassembly is simple.

The absorption of forces (notably in traction) is optimized. This helps to increase the service life of the different seals.

Of course, the invention is not limited to the examples described above. For example, the spacer 23 may be part of (one-piece or otherwise) the upper housing portion 25.

Similarly, the support part 9 and at least a part of the central guide 8 may be one-piece parts, provided that the resulting parts can be inserted through the longitudinal opening 50.

A compression apparatus 1 of this type (or a plurality in series or in parallel) may be used in any cryogenic installation that requires the pumping or compressing of a cryogenic fluid. For example, a station for filling tanks of pressurized gas (hydrogen for example) may comprise a source 17 of liquefied gas, a withdrawal circuit 18 having a first end connected to the source and at least one second end intended to be connected to a tank 190 to be filled, the withdrawal circuit 18 comprising such a pumping apparatus 1. The fluid pumped may be vaporized in a downstream exchanger 19 and optionally stored in one or more pressurized buffer tanks 20.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A fluid compression apparatus comprising:

a compression chamber, an intake system in communication with the compression chamber, a piston comprising an axial body moveable in translation in a longitudinal direction to compress the fluid in the compression chamber, the piston being moveable in relation to a static structure of the apparatus, the body of the piston comprising a tubular portion mounted about a static central guide connected to the static structure, a discharge orifice in communication with the compression chamber and designed to enable the egress of compressed fluid, a sealing system formed between the central guide and the tubular portion of the piston, the compression chamber being delimited by the tubular portion of the piston and a terminal end of the central guide, the central guide being connected to the static structure via a support part received in a longitudinal opening formed in the body of the piston and enabling the relative longitudinal sliding of the piston about the support part, wherein, during the translational movements of the piston, the body of the piston slides about the support part without passing through the support part.

2. The apparatus of claim 1, wherein the longitudinal opening of the piston is delimited by a fork-shaped portion of the body of the piston with several branches, the longitudinal opening being formed by the spacing between the branches.

3. The apparatus of claim 1, wherein the support part extends transversely to the longitudinal direction between two lateral ends projecting beyond the body of the piston, each of the two lateral ends of the support part being connected to the structure.

4. The apparatus of claim 1, wherein the central guide is rigidly connected to the support part by at least one of the following: screwing, fitting, and elastic deformation, the support part being rigidly connected to the static structure.

5. The apparatus of claim 1, wherein the support part is held longitudinally static in the structure between two longitudinal holding stops located on both sides of the support part in a longitudinal direction.

6. The apparatus of claim 1, wherein the structure comprises two tubular housing portions joined longitudinally to one another about the piston.

7. The apparatus of claim 5, wherein at least one of the two tubular housing portions forms a longitudinal holding stop at one longitudinal end of the support part.

8. The apparatus of claim 6, wherein it comprises a spacer mounted about the body of the piston, the spacer being arranged between the body of the piston and at least one of the two tubular housing portions, the spacer forming a longitudinal holding stop at one longitudinal end of the support part.

9. The apparatus of claim 1, wherein the support part is held static transversely to the longitudinal direction by a transverse holding stop formed by the structure.

10. The apparatus of claim 1, wherein the discharge orifice is located at the terminal end of the central guide, the apparatus comprising a discharge circuit for the compressed fluid comprising a first end connected to the discharge orifice and a second end located opposite the first end in the longitudinal direction, the discharge circuit for the compressed gas passing through the body of the central guide and the support part.

11. The apparatus of claim 1, wherein the body of the piston is made of several parts joined longitudinally to one another in a disassemblable manner.

12. The apparatus of claim 2, wherein the tubular portion and the fork-shaped portion of the body of the piston are joined longitudinally to one another in a disassemblable manner.

13. The apparatus of claim 1, wherein it is a two-stage compression apparatus and comprises a pre-compression chamber, a pre-intake system in communication with the pre-compression chamber designed to enable fluid to enter the pre-compression chamber, the intake system being in communication with the pre-compression chamber to enable compressed fluid in the pre-compression chamber to be transferred to the compression chamber for additional compression.

14. The apparatus of claim 1, wherein it comprises a fluidtight enclosure connected to the structure and designed to contain a bath of cryogenic fluid including a liquid phase and an expansion space, the compression chamber being seated in the enclosure to be immersed in the bath.

15. A station for filling tanks or lines with pressurized gas, comprising a source of liquefied gas, a withdrawal circuit having a first end connected to the source and at least one second end intended to be connected to a tank to be filled, the withdrawal circuit comprising a pumping apparatus or a fluid compression apparatus of claim 1.

* * * * *